C. R. CARLSON.
PROTECTIVE DEVICE FOR MOVING PICTURE MACHINES.
APPLICATION FILED APR. 30, 1920.
1,369,397.
Patented Feb. 22, 1921.
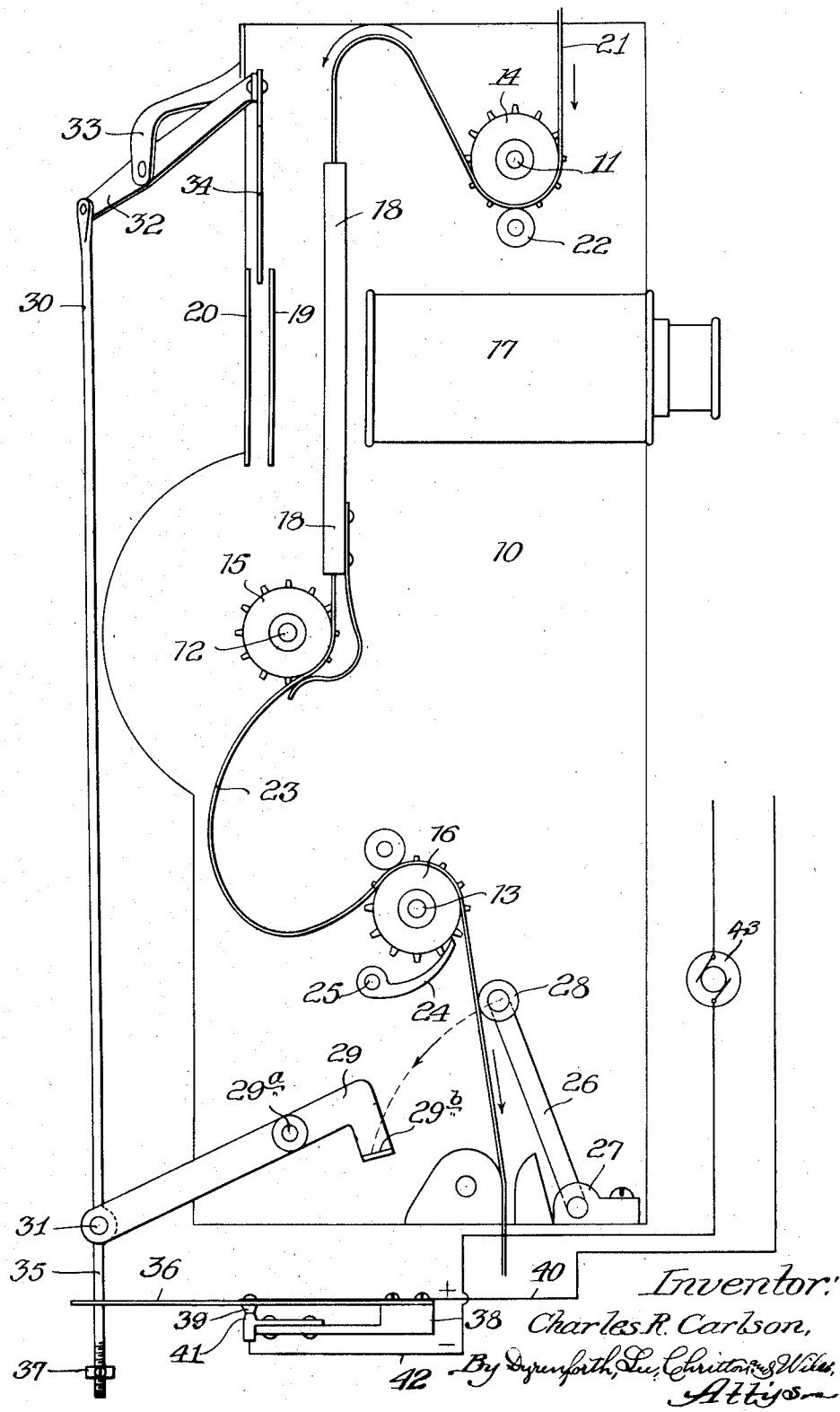

UNITED STATES PATENT OFFICE.

CHARLES R. CARLSON, OF AURORA, ILLINOIS, ASSIGNOR OF ONE-HALF TO JAMES H. PEARSON, OF AURORA, ILLINOIS.

PROTECTIVE DEVICE FOR MOVING-PICTURE MACHINES.

1,369,397.  Specification of Letters Patent.  Patented Feb. 22, 1921.

Application filed April 30, 1920. Serial No. 377,747.

*To all whom it may concern:*

Be it known that I, CHARLES R. CARLSON, a citizen of the United States, residing at Aurora, in the county of Kane and State of Illinois, have invented a new and useful Improvement in Protective Devices for Moving-Picture Machines, of which the following is a specification.

It is customary in moving picture machines to provide a shutter which is connected to the operating mechanism of the projecting machine so that as long as the projector is operated above a given speed the shutter will remain inoperative, but which will move to shut off the intense light upon the picture as soon as the speed of the moving picture machine falls below a predetermined limit.

Such a device, however, does not provide for the contingency which sometimes happens that the film fails to feed on to the lower reel as rapidly as it is fed by the lower feed sprocket. It sometimes happens too, that a break occurs between the intermittent sprocket and the lower reel. In either of these cases, film will pile up within the projector and eventually causing the film to fail to feed past the intermittent sprocket, even though that sprocket continues to rotate in the usual way. The result is that the shutter previously mentioned will not operate to shut off the light and that the film will be set on fire.

The primary object of this invention is to provide a means such as a shutter which will operate at such a time to shut off the beam of light and preferably at the same time to stop the projector mechanism.

The invention is fully described in the following specification and shown in the accompanying drawing, in which the figure is a diagrammatic view of a side elevation of a moving picture projector with the fireproof covers removed.

I have illustrated an embodiment of my protective device in connection with a moving picture machine having a main frame 10 in which are journaled the top shaft 11, the intermittent shaft 12, and the lower shaft 13, having top feed, intermediate and lower feed sprockets 14, 15 and 16, respectively, secured thereto. The main frame 10 carries the usual lens housing 17, the film guides 18 and the protecting plates 19 and 20. The governor controlled shutter which was previously mentioned and which is usually supplied with such a machine is not illustrated.

The film 21 comes from the upper feeding reel (not shown), passes down around the top feed sprocket 14 and is pressed thereto by means of the roller 22 and thence passes, as indicated by the arrows down through the vertical guide 18 and around the intermittent sprocket 15, thence through the loop 23 to the lower feed sprocket 16 and from there to the lower reel, which is not shown.

The usual stripper 24 is adjustably mounted on the pin 25 and serves to strip the film from the lower feed sprocket 16. A crank 26 is pivotally mounted in the bearing 27 and carries a roller 28 which is normally supported upon the film which is stretched between the lower feed sprocket 16 and the lower reel. A lever 29 is hingedly mounted at $29^a$ to the main frame 10 and has an end $29^b$ which lies in the path of the outer end of the crank 26. The opposite end of the lever 29 has a link 30 pivotally secured thereto by means of a pin 31. The upper end of the link 30 is similarly connected to a lever 32, which is pivotally mounted upon a bracket 33, which is carried by the main frame 10. A shutter 34 is pivotally connected to the lever 32 and is movable up and down between the protecting plates 19 and 20. These parts are so balanced as to remain normally in the position shown.

The operation of my device is as follows: A film 21, 23 is threaded through the machine and over the sprocket substantially as illustrated. The firm is stretched between the lower feed sprocket 16 and the lower reel and supports the roller 28, thereby retaining the crank 26 in the position shown. If the film breaks below the lower feed sprocket or if undue slackness occurs because of a failure of the lower reel to take up the film fast enough, the crank 26 will fall and strike the end $29^b$ of the lever 29, thereby causing the link 30 to rise and the shutter 34 to drop shutting off light from the film.

Either a break or a stoppage of the film may readily occur without the knowledge of the operator and when it does the film piles up completely filling the space between the sprockets 15 and 16 until finally the sprocket 15 is no longer able to force any more film down into this space. Slippage will then occur between the intermittent sprocket 15 and the film passing around it and the film in the vertical guide 18 is then subjected in the usual moving picture projector to the excessive heat from the lamp house and as a result catches fire. If this fire travels down, as sometimes happens, through the vertical guide 18 to the mass of film passing to the lower part of the projector, a very dangerous fire occurs. This is prevented as stated above by this invention.

I have also provided a means for stopping the moving picture machine at the same time, which consists of a rod 35, hingedly connected to the pin 31 and freely slidable through a hole in the flexible member 36. The rod 35 has adjusted at its lower end a nut 37. The flexible member 36 is secured to an insulating block 38 and carries an insulated electrical terminal 39 which is electrically connected to the lead 40. The other contact terminal 31 is connected to the lead 42. The switch thus formed is connected through these leads in series with the motor 43 driving the moving picture machine.

When, therefore, the lever 29 moves so as to drop the shutter 24, the flexible member 36 is also raised by means of the nut 37 and the current supplied to the motor is shut off, thereby stopping the moving picture machine.

While I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is;

1. In a moving picture machine, a frame, a lever carried thereby, a shutter hingedly suspended from said lever, said lever normally holding the shutter in an inoperative position, a second lever connected to said first mentioned lever, and a member normally held out of engagement with said second lever by the film and movable to engage said second lever when it is no longer supported by the film, whereby the shutter will be moved by said lever to closed position.

2. In a moving picture machine, a frame, a lever carried thereby, a shutter movable by said lever, said lever normally holding the shutter in an inoperative position, a second lever connected to said first mentioned lever, and a member normally held out of engagement with said second lever by the film and movable to engage said second lever when it is no longer supported by the film, whereby the shutter will be moved by said lever to closed position.

CHARLES R. CARLSON.